(12) United States Patent
Veeder et al.

(10) Patent No.: US 10,322,387 B2
(45) Date of Patent: Jun. 18, 2019

(54) ENHANCED REEL MIXER DRIVE

(71) Applicant: KUHN NORTH AMERICA, INC., Brodhead, WI (US)

(72) Inventors: Jacob Veeder, Browntown, WI (US); Jeremiah Kleiber, Darlington, WI (US); Pierre Courtin, Chateaubriant (FR); Rod Zimmerman, New Glarus, WI (US); Dana Redman, Orfordville, WI (US); Claude McFarlane, Fitchburg, WI (US)

(73) Assignee: KUHN NORTH AMERICA, INC., Brodhead, WI (US)

( * ) Notice: Subject to any disclaimer, the term of this patent is extended or adjusted under 35 U.S.C. 154(b) by 605 days.

(21) Appl. No.: 15/015,352

(22) Filed: Feb. 4, 2016

(65) Prior Publication Data

US 2017/0225136 A1    Aug. 10, 2017

(51) Int. Cl.
*A01K 5/00*      (2006.01)
*B01F 7/00*      (2006.01)
(Continued)

(52) U.S. Cl.
CPC ........ *B01F 15/00461* (2013.01); *A01K 5/002* (2013.01); *B01F 7/00583* (2013.01); *B01F 7/00975* (2013.01); *B01F 7/081* (2013.01); *B01F 13/1025* (2013.01); *B01F 15/0048* (2013.01); *B01F 15/00435* (2013.01); *B01F 15/00441* (2013.01); *B01F 15/00545* (2013.01); *B01F 15/00714* (2013.01); *B01F 15/0289* (2013.01); *F16D 7/02* (2013.01);
(Continued)

(58) Field of Classification Search
CPC ................. A01K 5/002; B01F 13/1025; B01F 15/00435; B01F 15/00441; B01F 15/00461; B01F 15/0048; B01F 15/00545; B01F 15/00714; B01F 15/0289; B01F 2015/0011; B01F 2015/00623; B01F 2215/0008; B01F 7/00583; B01F 7/00975; B01F 7/081; F16D 7/02; F16D 9/06; F16H 57/025
See application file for complete search history.

(56) References Cited

U.S. PATENT DOCUMENTS 2,344,388 A * 3/1944 Bixby .................... B60K 17/36
180/24
3,129,927 A * 4/1964 Mast .................... A01K 5/0216
366/157.2
(Continued)

OTHER PUBLICATIONS

"Manual", ROTO-MIX, 920-18 Truck & Trailer Feed Mixer, Assembly, Operation and Parts Manual, 2006, 83 pages.

*Primary Examiner* — Tony G Soohoo
(74) *Attorney, Agent, or Firm* — Oblon, McClelland, Maier & Neustadt, L.L.P.

(57) ABSTRACT

A system for driving a reel mixing tool, including a unit structure, a bottom output shaft, an output gearbox, a reel mixer driveshaft, a reel mixer gearbox, a flexible coupling, and a reel mixing tool, is provided. The unit structure supports the bottom output shaft which is connected to the output gearbox, the output gearbox is connected to the reel mixer driveshaft, the reel mixer driveshaft is connected to the reel mixer gearbox, the reel mixer gearbox is directly coupled to the reel mixing tool by the flexible coupling, allowing the bottom output shaft to transfer power through to the reel mixing tool.

19 Claims, 7 Drawing Sheets

(51) Int. Cl.
*B01F 7/08* (2006.01)
*F16D 7/02* (2006.01)
*F16D 9/06* (2006.01)
*B01F 13/10* (2006.01)
*B01F 15/00* (2006.01)
*B01F 15/02* (2006.01)
*F16H 57/025* (2012.01)

(52) U.S. Cl.
CPC ............. *F16D 9/06* (2013.01); *F16H 57/025* (2013.01); *B01F 2015/0011* (2013.01); *B01F 2015/00623* (2013.01); *B01F 2215/0008* (2013.01)

(56) References Cited

U.S. PATENT DOCUMENTS

| | | | | |
|---|---|---|---|---|
| 4,506,990 A * | 3/1985 | Neier | ...................... | A01K 5/002 366/299 |
| 4,571,091 A * | 2/1986 | Pardo | ...................... | B01F 7/165 366/311 |
| 4,597,672 A * | 7/1986 | Neier | ...................... | A01K 5/002 366/186 |
| 4,799,800 A * | 1/1989 | Schuler | ................... | A01K 5/002 366/296 |
| 5,421,651 A * | 6/1995 | Pickering | ............ | B01F 7/00208 366/311 |
| 5,489,152 A * | 2/1996 | Rumph | ............... | B01F 7/00075 366/311 |
| 6,409,376 B1 | 6/2002 | Knight | | |
| 6,572,260 B2 | 6/2003 | Knight | | |
| 6,694,867 B1 * | 2/2004 | Roth | .................... | B01F 7/00025 366/144 |
| 7,347,614 B2 * | 3/2008 | Cicci | ...................... | A01K 5/004 241/101.76 |
| 8,600,565 B2 * | 12/2013 | Bassett | ............. | B01F 15/00389 700/282 |
| 8,646,967 B2 * | 2/2014 | Marggi | .................. | A01K 5/002 366/299 |
| 8,657,485 B2 * | 2/2014 | Neier | ...................... | A01K 5/004 366/297 |
| 9,010,991 B2 * | 4/2015 | McFarlane | ............ | B01F 7/085 366/270 |
| 2005/0099885 A1 * | 5/2005 | Tamminga | ............. | A01K 5/004 366/314 |
| 2006/0062078 A1 * | 3/2006 | Jejcic | .................. | B01F 7/00175 366/310 |
| 2006/0126430 A1 * | 6/2006 | Cicci | ...................... | A01K 5/004 366/314 |
| 2007/0140053 A1 * | 6/2007 | Jejcic | .................... | A23G 9/224 366/311 |
| 2007/0297284 A1 * | 12/2007 | Neier | ...................... | A01K 5/002 366/299 |
| 2013/0062854 A1 * | 3/2013 | Gorrell | ................... | B60G 9/02 280/124.169 |
| 2017/0225136 A1 * | 8/2017 | Veeder | ................. | B01F 7/00975 |
| 2018/0254740 A1 * | 9/2018 | Corio | ..................... | F24S 25/12 |
| 2018/0255823 A1 * | 9/2018 | Rowntree | ............ | A23N 17/007 |
| 2018/0282093 A1 * | 10/2018 | Matsui | .................. | B65H 9/004 |

* cited by examiner

ENHANCED REEL MIXER DRIVE

BACKGROUND

Field of the Disclosure

The present disclosure is directed toward an enhanced reel mixer drive system and method.

Description of the Related Art

The art continues to be developed with the aim of improving reliability and efficiency, maximizing operational uptime and minimizing maintenance and repair costs of reel mixers.

Current animal feed mixer drive systems are driven by sprockets and chains. FIG. 1 describes an example of a current design of a reel mixer drive system for mixing animal feed inside a unit structure 1, the reel mixer drive system comprising a bottom output shaft 12, a first auger sprocket 8, a second auger sprocket 10, a reel mixer sprocket 6, a first chain 14, a second chain 16, and a third chain 18. The system is connected to the back of the unit structure 1. It is also known in the art to use a gearbox in place of the bottom output shaft 12 to drive the reel mixer sprocket 6 directly via a chain.

Rotational power is transferred from the bottom output shaft 12 connected to the first chain 14. The first chain 14 is connected to the second auger sprocket 10. The first auger sprocket 8 is connected to the second auger sprocket 10 by the second chain 16. The first auger sprocket 8 is connected to the reel mixer sprocket 6 by a third chain 18.

Due to the ratio between the sprockets and augers in this arrangement, a reel mixer 5 is driven at a very low speed relative to the input speed of the bottom output shaft 12. In one case, the ratio is approximately 1:150, and has a proportionately high level of torque. If obstructions occur the failure of at least one of the chains is relied upon for protection against major structural damage of mixing components.

FIG. 2 describes a perspective side projection of current art with the reel mixer sprocket 6, a rear enclosure, and a side panel removed to show mixing components including a first auger 26, a second auger 28, a reel mixing tool 38, and a rear bearing 25 of the reel mixer sprocket 6. The first auger 26 moves material in a rear to front direction relative to the unit to discharge material and the second auger 28 moves material in a front to rear direction to evenly distribute material and keep it level within the unit structure 1. The rotational axes of the first auger 26, the second auger 28, and the reel mixing tool 38 are substantially parallel, with the first auger 26 disposed substantially vertically below the second auger 28, and the reel mixing tool 38 disposed adjacent to the first auger 26 and the second auger 8.

Also common to current reel mixers 5, a reel mixing tool 38 is supported by a front bearing 24 (note: the front bearing 24 cannot be seen in these images as it is on the outside of the front panel) connected to the front panel of the unit structure 1, and supported on the rear end of the unit structure 1 by the rear bearing 25 mounted to the rear panel 22 of the unit structure 1.

One example of a reel mixing tool is described in U.S. Pat. No. 8,646,967, which is incorporated by reference. The front bearing 24 and the rear bearing 25 are separate components from the sprockets utilized to transmit rotational power. The interior surface of the rear panel 22 is also one relatively continuous flat surface due to the current configuration of the standard drive. These are all common features that current designs of reel mixers 5 incorporate that are no longer necessary due to the redesign detailed in the following description.

The chains and sprockets are typically housed in an enclosed structure that may contain some oil to lubricate the chains. This structure is removed for clarity.

FIG. 3 describes the positions of the first auger 26 and the second auger 28 relative to each other. A disadvantage of the chain drive system is the fixed and interconnected relationship between the various sprockets and chains. If one mixer, auger, sprocket, or chain becomes locked or jammed during operation, the components connected to that mixer, auger, sprocket or chain are vulnerable to catastrophic failure, particularly given the high torque of the relatively large sprockets. Additionally, the use of large sprockets for the gear reduction from the higher speed of the output gearbox to the lower speeds of the augers and the reel mixer amplify the effective torque of the bottom output shaft 12 at key points in the system, exacerbating vulnerability.

SUMMARY

The present disclosure is directed to a system for driving a reel mixer for mixing animal feed, the system including a reel mixer gearbox, a reel mixing tool directly connected to the reel mixer gearbox, and a unit structure connected to the reel mixer gearbox. The unit structure supports the reel mixer gearbox, and the reel mixer gearbox supports and drives the reel mixing tool.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

Figure 1:
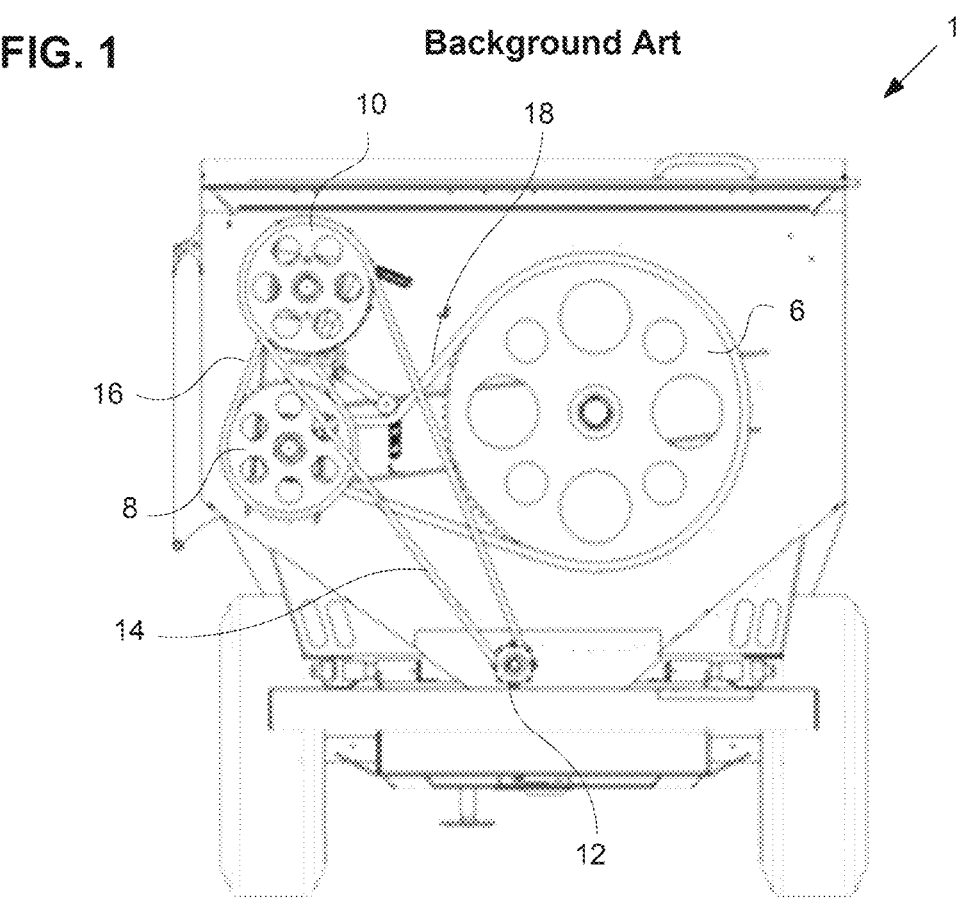
FIG. 1 is an example of a current reel mixer drive system design.

Referring now to the drawings, wherein like reference numerals designate identical or corresponding parts throughout the several views.

Figure 2:
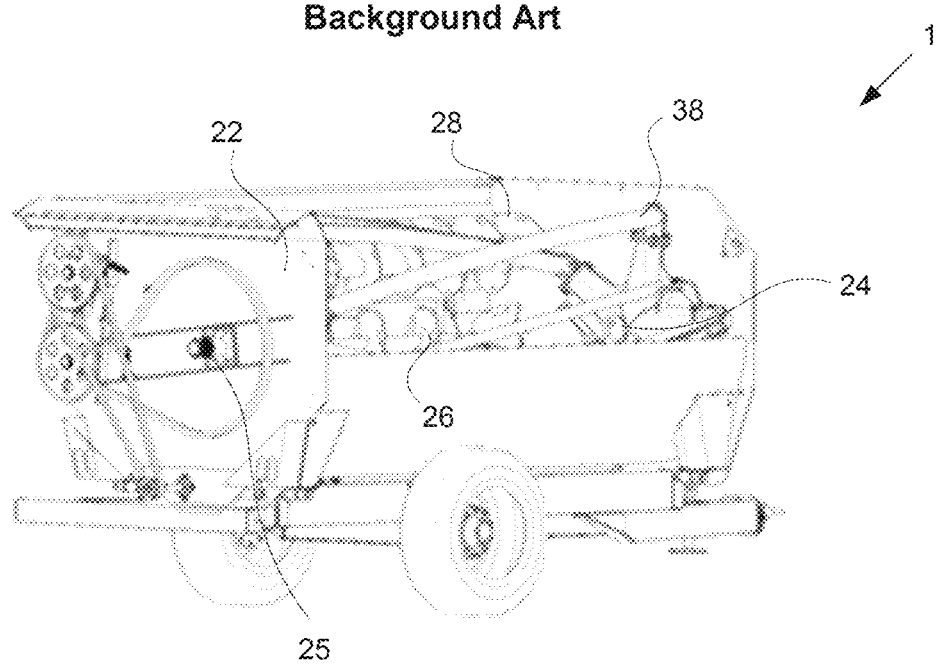
FIG. 2 is a perspective side projection view of the current reel mixer with a sprocket and oil bath structure removed for clarity.
Figure 3:
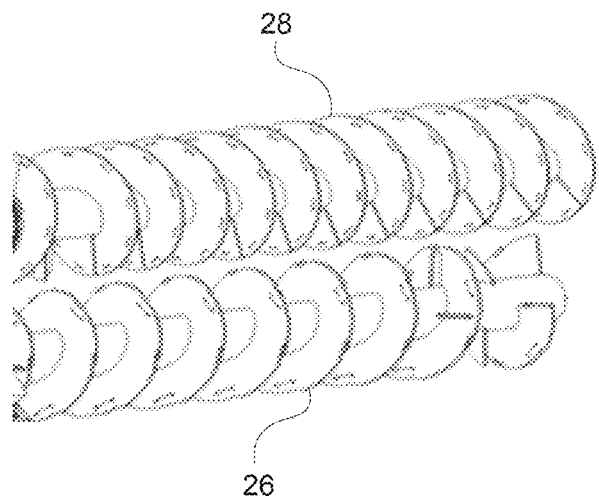
FIG. 3 is an example arrangement of a first auger and a second auger in the current reel mixer.
Figure 4A:
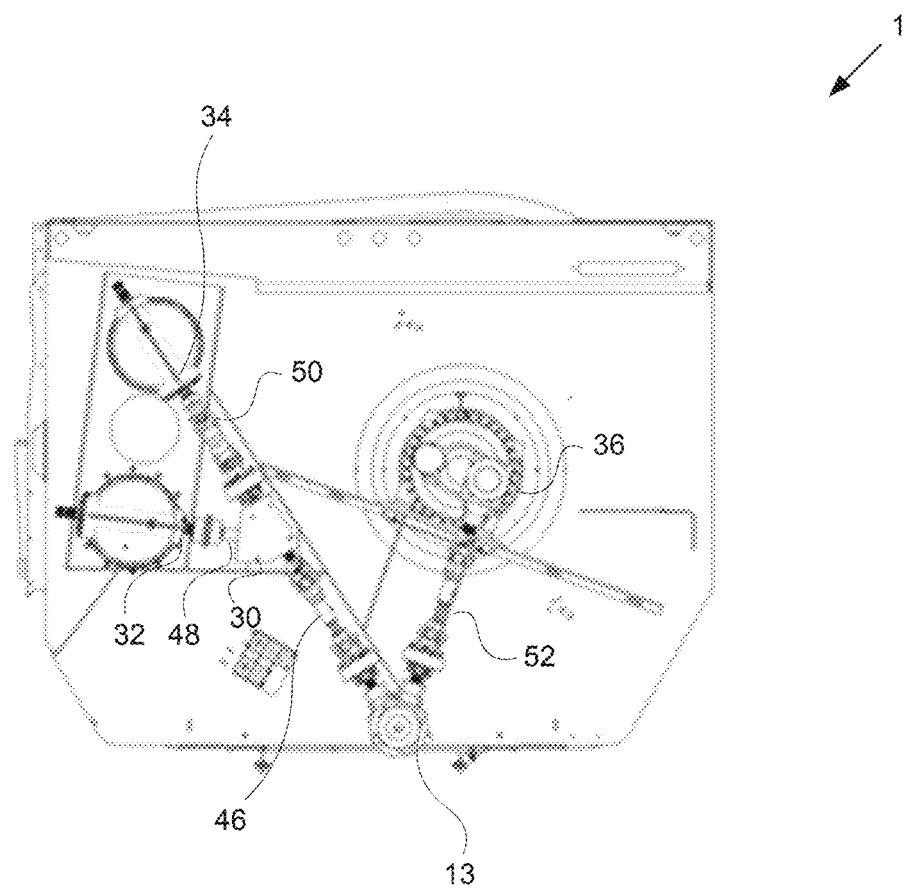
FIG. 4A describes a rear view of an embodiment of a fully mechanical reel mixer drive system including torque limiting devices.

FIG. 4A describes a rear view of an embodiment of a fully mechanical reel mixer drive system that uses gearboxes in place of chains or any other purely tension members to transmit power. The first auger 26, the second auger 28, and the reel mixing tool 38 are positioned substantially similar to the system described by FIG. 1, FIG. 2, and FIG. 3. However, the first auger 26, the second auger 28, and the reel mixing tool 38 are driven via mechanical gearboxes and driveshafts.

The drive system includes an output gearbox 13, a first auger gearbox 32, a second auger gearbox 34, a reel mixer gearbox 36, a secondary gearbox 30, a primary driveshaft 46, a first auger driveshaft 48, a second auger driveshaft 50, and a reel mixer driveshaft 52.

The output gearbox 13 is connected to the bottom output shaft 12 (not shown). A first end of the reel mixer driveshaft 52 is connected to the output gearbox 13, and a second end of the reel mixer driveshaft 52 is connected to the reel mixer gearbox 36, directing power from the output gearbox 13 to the reel mixer gearbox 36. In this example, the reel mixer gearbox 36 is a planetary-type design to provide a large gear reduction from the bottom output shaft 12 through to the reel mixing tool 38. The reel mixing tool 38 and the bottom output shaft 12 are not shown in this view.

In this example, the first auger 26 and the second auger 28 are driven by a parallel drive system. In addition to the second end of the reel mixer driveshaft 52, the output gearbox 13 is also connected to a first end of the primary driveshaft 46. A second end of the primary driveshaft 46 is connected to the secondary gearbox 30. The power output of the secondary gearbox 30 is simultaneously directed to the first auger gearbox 32 and the second auger gearbox 34 by the first auger driveshaft 48 and the second auger driveshaft 50, respectively.

The reel mixer gearbox 36, the first auger gearbox 32, and the second auger gearbox 34 are each drivingly connected to the reel mixing tool 38, the first auger 26, and the second auger 28, respectively. The housing of each of the gearboxes is attached to the unit structure 1.

The first auger gearbox 32 and the second auger gearbox 34 are drivingly coupled to the first auger 26 and the second auger 28, respectively. The reel mixing tool 38, the first auger 26, and the second auger 28 are all driven independently of one another, and the stoppage of one does not result in failure of the others.

The resulting unit structure 1 equipped with a gearbox (or gearboxes) is simpler, lighter, and more reliable than that of the background art. Each of the unit structures 1 of FIG. 4A through FIG. 11B may not have a reservoir to contain oil for lubrication of a chain, covers and seals to contain oil and prevent leakage from chains and sprockets, and less structure is needed to support oil supply and containment equipment.

Figure 4B:
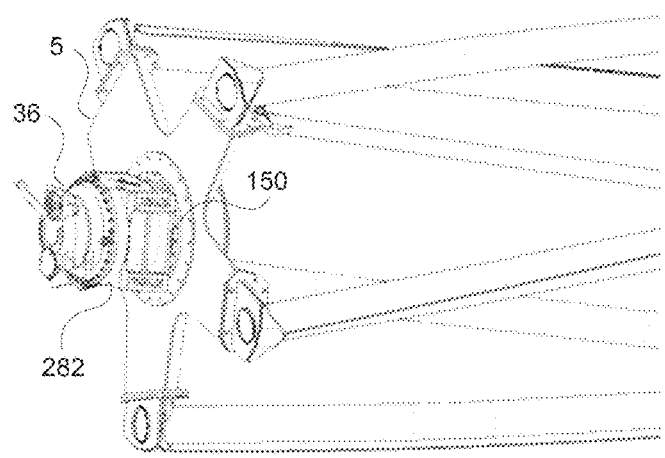
FIG. 4B is a perspective views of an embodiment of a reel mixer gearbox connected to a reel mixer gearbox flange, a reel mixer, and a gearbox mounting flange.
Figure 4C:
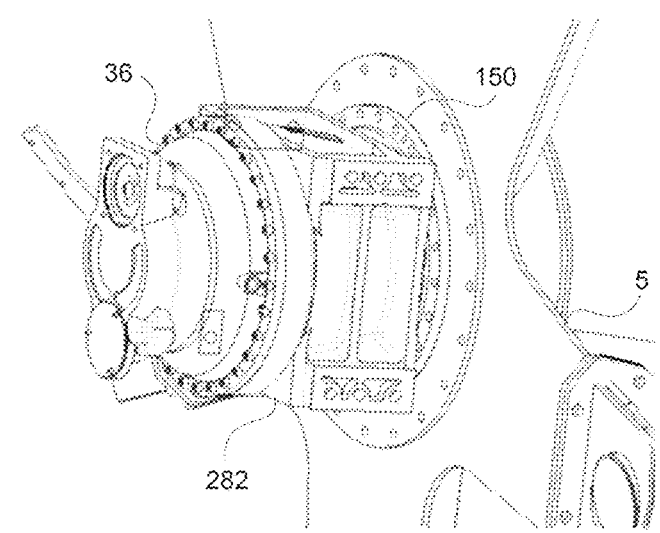
FIG. 4C is a close-up perspective views of an embodiment of a reel mixer gearbox connected to a reel mixer gearbox flange, a reel mixer, and a gearbox mounting flange.

FIG. 4B and FIG. 4C are perspective views of an embodiment of a reel mixer gearbox 36 connected to a reel mixer gearbox flange 150, a reel mixing tool 38, and a gearbox mounting flange 282. FIG. 4C is a close up view of FIG. 4B. Additional components are shown and described in greater detail in the section view of FIG. 9.

FIG. 4C is a close up perspective view of an embodiment of a reel mixer gearbox 36 connected to a gearbox mounting flange 282.

Figure 5:
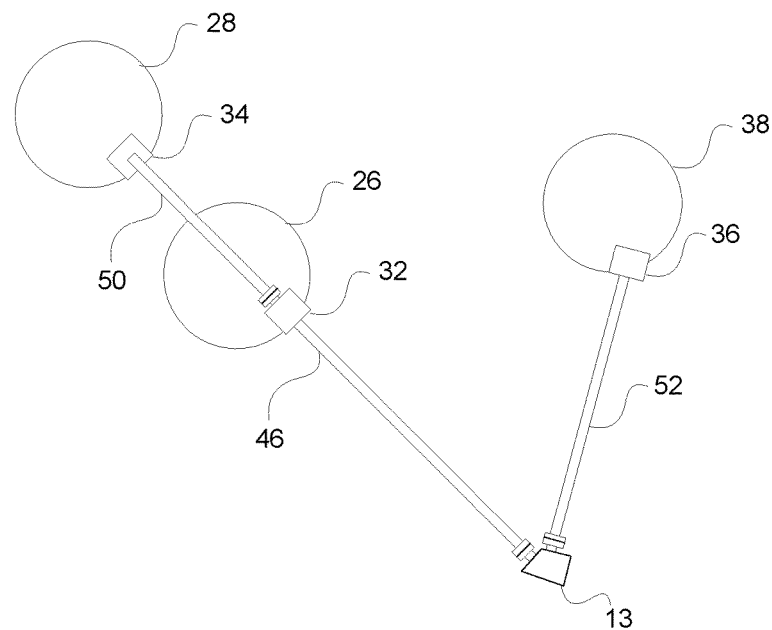
FIG. 5 describes a diagram of a rear view of another embodiment of a fully mechanical reel mixer drive system including torque limiting devices.

FIG. 5 describes a diagram of a rear view of another embodiment of a fully mechanical reel mixer drive system that uses gearboxes. The first auger 26, the second auger 28, and the reel mixing tool 38 are positioned relatively similar as the system described by FIG. 4. However, the mechanical gearboxes and driveshafts are arranged differently.

The drive system includes an output gearbox 13, a first auger gearbox 32, a second auger gearbox 34, a reel mixer gearbox 36, a primary driveshaft 46, a second auger driveshaft 50, and a reel mixer driveshaft 52.

The output gearbox 13 is connected to a bottom output shaft 12 (not shown). A first end of the reel mixer driveshaft 52 is connected to the output gearbox 13, and a second end of the reel mixer driveshaft 52 is connected to the reel mixer gearbox 36, directing power from the output gearbox 13 to the reel mixer gearbox 36. The reel mixer gearbox 36 is a planetary-type design to provide a large gear reduction from the bottom output shaft 12 through to the reel mixing tool 38.

In this example, the first auger 26 and the second auger 28 are driven by a series drive system. In addition to the first end of the reel mixer driveshaft 52, the output gearbox 13 is also connected to the first end of the primary driveshaft 46. A second end of the primary driveshaft 46 is connected to a first auger gearbox 32. The power output of the first auger gearbox 32 drives the first auger 26. Further, a first end of the second auger driveshaft 50 is connected to the first auger gearbox 32. A second end of the second auger driveshaft 50 is connected to the second auger gearbox 34. The first auger gearbox 32 and the second auger gearbox 34 are drivingly connected to the first auger 26 and the second auger 28, respectively.

The reel mixer gearbox 36, the first auger gearbox 32, and the second auger gearbox 34 are each drivingly connected to the reel mixing tool 38, the first auger 26, and the second auger 28, respectively. The body of each of the gearboxes is attached to the unit structure 1 (described in FIG. 1 and FIG. 2).

Figure 6:
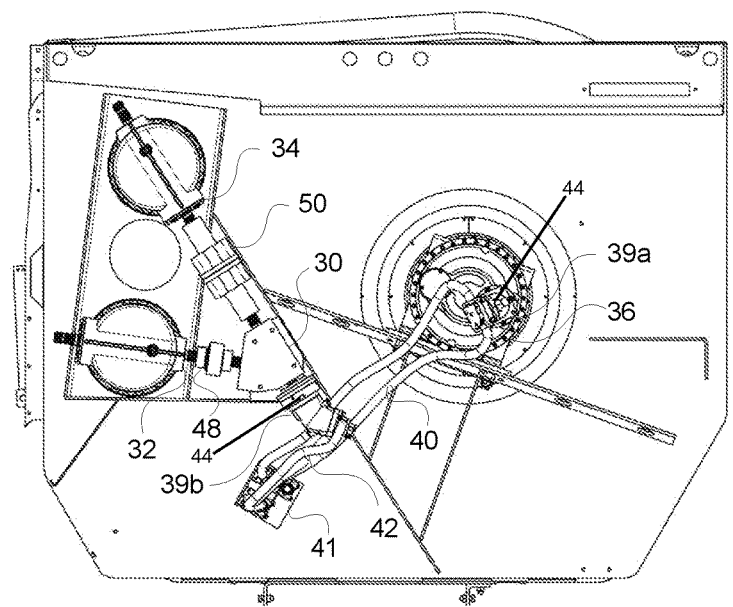
FIG. 6 is a rear view of a hydraulically powered reel mixer drive system.

FIG. 6 describes another example of a reel mixer drive system where a complete drive configuration of the reel mixing tool 38, the first auger 26, and the second auger 28 (as shown in FIG. 3 and FIG. 5) are hydraulically powered. A hydraulic power supply (not shown) is typically mounted aboard a tractor or a truck, is connected to a first pair of hydraulic lines 40 and a second pair of hydraulic lines 42. The first pair of hydraulic lines 40 and the second pair of hydraulic lines 42 are connected to a first hydraulic motor 39a and a second hydraulic motor 39b, respectively. The hydraulic motor 39a and the hydraulic motor 39b, respectively, are connected to the reel mixer gearbox 36, and the secondary gearbox 30, as applicable, to drive rotation of the mixing components in either a parallel or series arrangement, as described above. In the parallel arrangement examples of this disclosure, the first auger gearbox 32 and the second auger gearbox 34 are mechanically driven by the output of the secondary gearbox 30. Further, to protect the gearboxes from premature wear or damage, there may be torque limiting members 44, each a pressure relief valve built into the hydraulic motors 39a and 39b, or gearboxes, instead of disposed externally as in the mechanical version shown in FIG. 7. While the hydraulic system of FIG. 6 is shown with the second hydraulic motor 39b connected to a secondary gearbox 30, with a first auger gearbox 32 and a second auger gearbox 34 driven in parallel, the same hydraulic system could also be connected to a series drive system such as that depicted in FIG. 8, for example with the second hydraulic motor 39b connected to and driving the first auger gearbox 32, the first auger gearbox 32 also driving the second auger driveshaft 50, the second auger gearbox 34, and the second auger 28.

Figure 7:
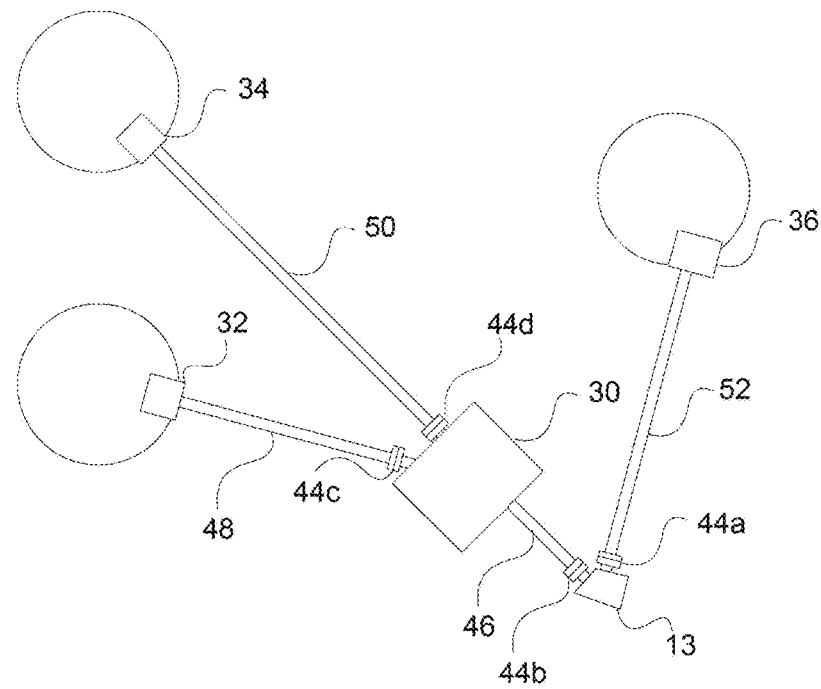
FIG. 7 is a diagram of a parallel mechanical reel mixer drive system equipped with torque limiters.

FIG. 7 is a diagram of the drive members (described by FIG. 4) equipped with torque limiting members 44 such as a shear bolt, a ball detent torque limiter, a slip clutch, or the like. This allows for overload protection against any obstructions experienced by the reel mixing tool 38, the first auger 26, or the second auger 28. If any of these elements stop unexpectedly due to an obstruction in the system, the respective torque limiting member 44 can disengage the drive to prevent further damage to said elements and other drive system components.

Each torque limiting member 44, depending on its design, may be disposed within a gearbox or axially between a driveshaft and a gearbox, or serve as a connection between at least two drive elements, for example between two driveshafts.

The torque limiting members 44 include a reel mixer torque limiter 44a, an output torque limiter 44b, a first auger torque limiter 44c, and a second auger torque limiter 44d. In the examples shown, the reel mixer torque limiter 44a is disposed between the output gearbox 13 and the reel mixer driveshaft 52, the output torque limiter 44b is disposed between the output gearbox 13 and the primary driveshaft 46, the first auger torque limiter 44c is disposed between the secondary gearbox 30 and the first auger driveshaft 48, and the second auger torque limiter 44d is disposed between the secondary gearbox 30 and the second auger driveshaft 50.

If the torque experienced in any of the aforementioned torque limiting members 44 is greater than its design limit, the torque limiting member 44 will disengage and disconnect the drive system at the point in the system at which that torque limiting member 44 is located.

This allows each rotating element and subsystem to have its own torque limiting member 44 rather than rely on a torque limiting member 44 shared by multiple elements of the whole system, as is the case with the chain and sprocket system described in the background. If an obstruction arises in a chain and sprocket system, even if a chain breaks to limit damage, because at least two sprockets are connected to each chain, there is greater risk of damage because the system elements cannot be isolated from each other as distinctly, and therefore more of the drive system is exposed to the potential damage of torque spikes. By the time a chain breaks, there is a high probability that a first sprocket, auger, or mixing element has been damaged. A second sprocket, auger, or mixing element to which the chain was also connected is also at risk of damage.

A further advantage of the gearbox system over the chain and sprocket system is that the torque limit of each torque limiting member 44 can be tailored and distributed throughout the system to provide disengagement at an appropriate amount of torque for a specific element or group of elements, resulting in minimal (if any) damage to the drive system should it encounter an obstruction.

The torque limiting capabilities may exist in mechanical form such as a slip clutch or a shear bolt connection, or in fluid power form such as a relief valve that limits the amount of pressure applied to a hydraulic motor 39, therefore limiting the torque applied to a gearbox. Torque may also be limited by measuring pressure or torque with a sensor such as a pressure or torque transducer and using the output from the sensor as the input for a controller to limit, or if necessary, halt the input of torque.

Figure 8:
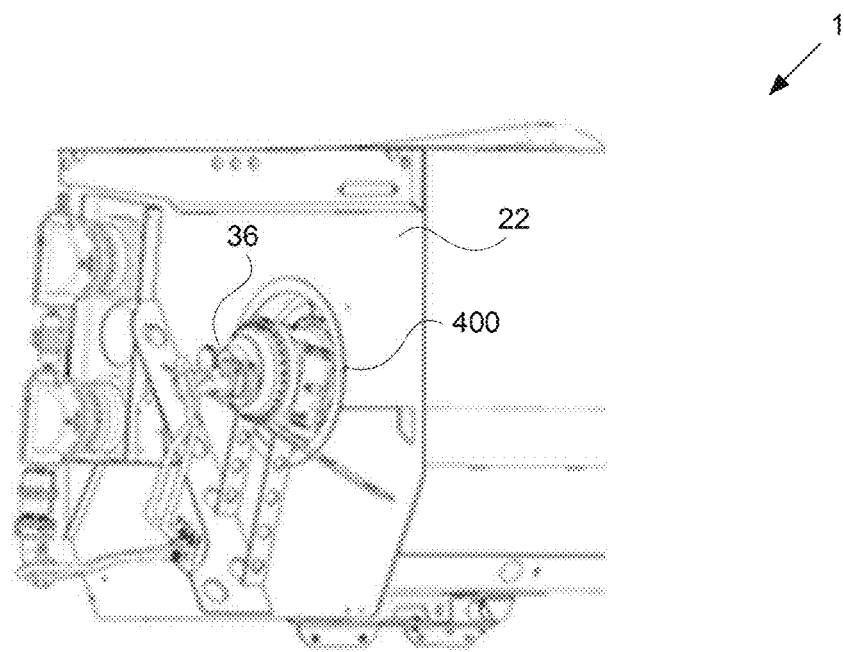
FIG. 8 is a view of the rear panel of a unit equipped with a gearbox mounted in a recess of a unit structure.

FIG. 8 describes the reel mixer gearbox 36 is drivingly connected to the reel mixing tool 38 (shown in FIG. 2) and mounted inwardly from the rear panel 22 of the unit structure 1 in a recessed structure 400. This allows the unit structure 1 to benefit from an overall abbreviated length and reduces the amount of structure necessary to support the reel mixer gearbox 36 due to the mounting surface of the reel mixer gearbox 36 being proximal to the surface of the rear panel 22, rather than extending past the rear panel 22.

Due to the mounting of the reel mixer gearbox 36 directly to the reel mixing tool 38, and the use of the internal bearings of the reel mixer gearbox to support the primary mixing member, the traditional bearing and seal arrangement of the example of FIG. 1 is no longer a reasonable solution. Therefore, a different technique for sealing the rear panel 22 of the unit structure 1 circumferentially to the rotating portion of the reel mixer gearbox 36 is provided.

Figure 9:
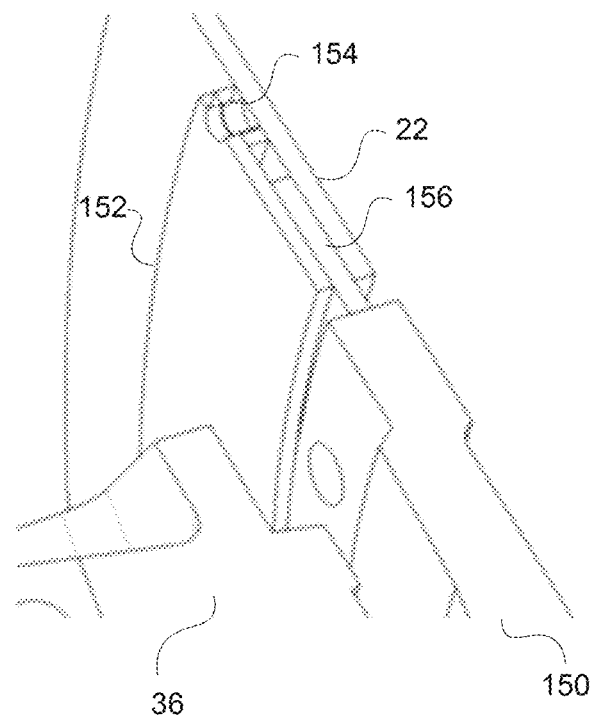
FIG. 9 is a section view of a gearbox flange and a seal connected to a rear panel of a unit structure.

An example of a rear panel mounting of the reel mixer gearbox 36 drivingly connected to the reel mixing tool 38, is described by the section view of FIG. 9. In the example, the reel mixer gearbox 36 is connected to the reel mixing tool 38 and supported by the rear panel 22. To form a seal between the reel mixer gearbox 36 and the reel mixing tool 38, a reel gearbox flange 150, an outer ring 152, a circumferential spacer 154, and a circumferential seal 156 are included. The center of the circumferential seal 156 is aligned with the center of the reel gearbox flange 150, and the circumferential seal 156 surrounds the reel gearbox flange 150. The rear panel 22 and the outer ring 152 are each adjacent to the 156, each having a circular opening slightly larger than the diameter of the reel gearbox flange 150. The rear panel 22 is in contact with a first flat surface of the circumferential seal 156 facing toward the reel mixing tool 38, and the outer ring 152 is in close proximity to a second flat surface of the circumferential seal 156 facing toward the reel mixer gearbox 36 such that the reel gearbox flange 150 is concentrically disposed inside the circumferential seal 156, and the circumferential seal 156 is disposed between the rear panel 22 and the outer ring 152.

In addition to the circumferential seal 156 being located between the rear panel 22 and the outer ring 152, and the circumferential seal 156 being in contact with both the rear panel 22 and the outer ring 152, the rear panel 22 and the outer ring 152 are both connected to at least one circumferential spacer 154 at points beyond the diameter of the circumferential seal 156. The outer ring 152 and the circumferential spacer 154 may be rigidly connected, and the circumferential spacer 154 and the rear panel 22 may be rigidly connected, for example by bolts, screws, dowel or welds. Further, the rear panel 22, the outer ring 152, and the circumferential spacer 154 may all be rigidly connected, for example by bolts, screws, dowels, rivets, or welds. The thickness of the circumferential spacer 154, and the thickness of the space between the rear panel 22 and the outer ring 152 created by the placement of the circumferential spacer 154, is substantially similar to the thickness of the circumferential seal 156. Thus, a seal is created around the circumferential seal 156 and the reel gearbox flange 150, allowing the reel gearbox flange 150 and the circumferential seal 156 to rotate together or independently, with the circumferential seal 156 floating within the confines of the groove between the rear panel 22, the outer ring 152, and the circumferential spacer 154, while the reel mixer gearbox 36 remains stationary and fixed to the unit structure during operation of the reel mixing tool 38 and the reel mixer gearbox 36, the reel mixer gearbox 36 connected to the reel gearbox flange 150.

With a rigid gearbox design, the connections between the driveshafts, the gearboxes, the first auger 26, the second auger 28, and the reel mixing tool 38 (as described by FIG. 10) are effectively maintained for reliable operation. Therefore, a number of flexible elements are used to provide the flexibility to accommodate manufacturing variances and shock loads during operation, and provide the drivetrain connections with the needed tolerances. These elements may come in a variety of forms, for example self-aligning bearings (FIG. 11B), flexible couplings, and elastomeric mounts.

Figure 10:
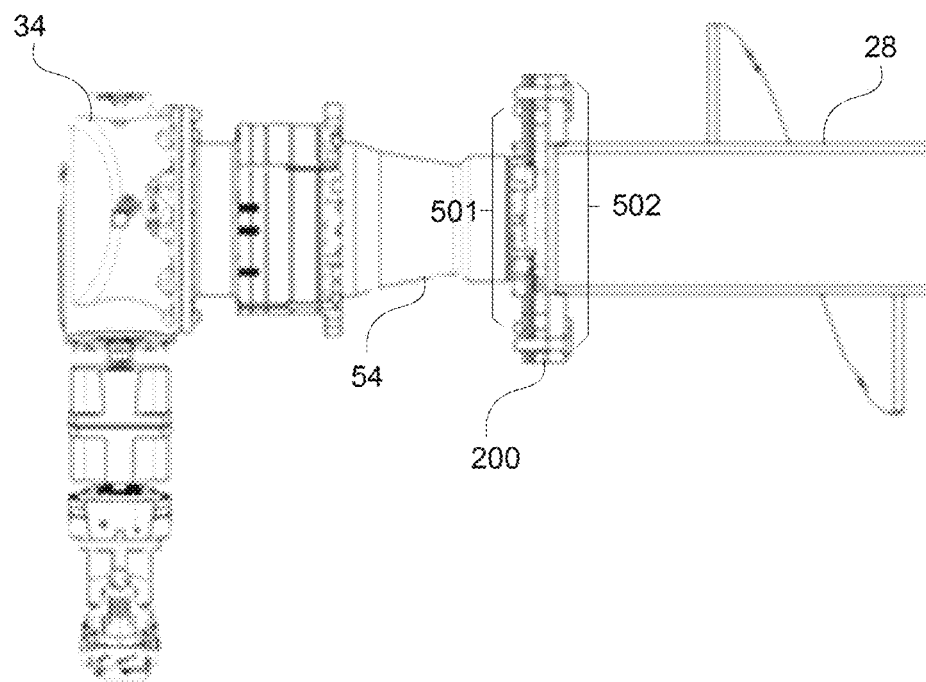
FIG. 10 describes an example configuration of a second auger connected to a tower and a flexible coupling.

The first auger 26 and the second auger 28 are mounted in such a way that their joints are able to flex and move without causing damage to their respective driving components. One way this may be accomplished is with the use of self-aligning bearings inside the first auger gearbox 32 and the second auger gearbox 34 that allow for misalignment. Another way is with the use of a flexible coupling 200 (FIG. 10). A flexible coupling 200 can be connected between the first auger gearbox 32 and the first auger 26, between the second auger gearbox 34 and the second auger 28, or between the reel mixer gearbox 36 and the reel mixing tool 38.

FIG. 10 describes an example configuration of the second auger 28 connected to a tower 54 with the flexible coupling 200 disposed between the second auger and a first end of the tower 54. In one embodiment the flexible coupling 200 is made of a material of appropriate pliability to allow the second auger 28 to move, minimizing the stress applied to the tower 54 and the second auger gearbox 34.

The flexible coupling 200 between the second auger 28 and the tower 54, includes two groups of radially placed holes with a difference in diameter. An inner group of holes 501 mounts to the output of the first end of the tower 54 and an outer group of holes 502 mounts to the structure of the second auger 28. The flexible coupling 200 with the inner group of holes 501 and the outer group of holes 502 has the appropriate pliability between the two aforementioned mounting surfaces to absorb misalignment and protect the second auger gearbox 34, which is connected to a second end of the tower 54, from damage and premature wear.

For example, the connections between the first auger 26, the second auger 28, the first auger gearbox 32, and the second auger gearbox 34, respectively, are designed to allow for misalignment. The allowance of misalignment is accomplished by the first auger gearbox 32 and the second auger gearbox 34 having self-aligning bearings.

Figure 11A:
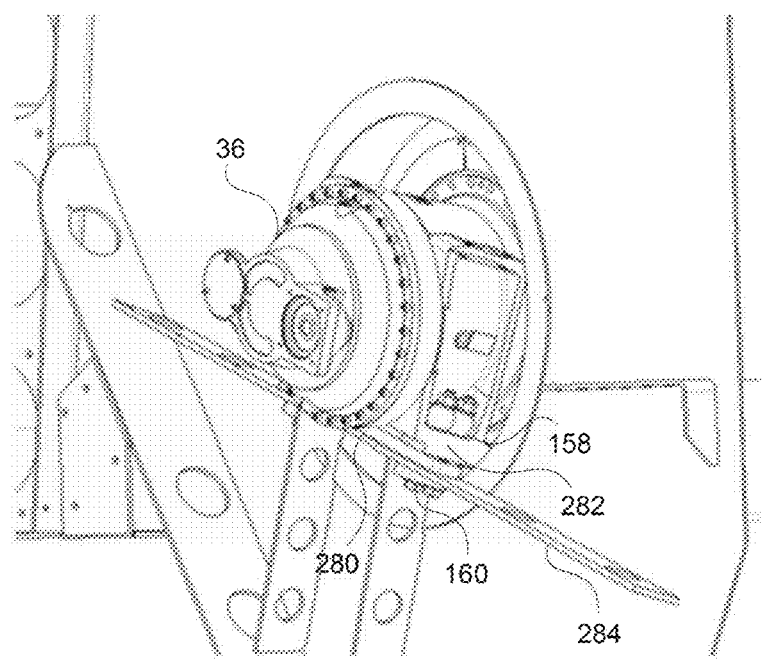
FIG. 11A is an example of an elastomeric gearbox mounting.

Each embodiment can also include elastomeric or similar material on the stationary mounting surface of each gearbox (see FIG. 11A).

FIG. 11A is an example of an elastomeric gearbox mounting including an elastomeric pad 160 and a plurality of elastomeric bushings 158. In this example the elastomeric pad 160 is mounted underneath a plate 284. The plate 284 is mounted underneath the mounting bracket 280, which is connected to the underside of the gearbox mounting flange 282.

The plate 284 beneath the mounting bracket of the reel mixer gearbox 36 and the spherical spacers 158 above the gearbox mounting flange 282 allow for flexibility at the mounting point and therefore additional misalignment.

The mounting bracket 280 itself may be formed of an elastomeric material and provide further flexing or, if the reel mixer gearbox 36 is not mounted using other elastomeric bushings 158, primary dampening for the reel mixer gearbox 36. The flexing of the elastomeric bushings 158 reduces the risk of catastrophic failure and premature wear of the drive train components (gearbox, driveshafts), and the likelihood of any torque limiting members 44 being triggered.

Further, self-aligning bearings 100 (shown in FIG. 11B) could also be used inside each gearbox to allow the connections between each gearbox and its respective driven component to maintain an efficient operating relationship, even if there is imprecision in their assembly and use, for example if the unit structure 1 flexes during operation. This allows for a modest amount of misalignment between driveshafts and mechanical connections joined through each self-aligning bearing 100, the driveshafts or driven components are able to be misaligned by several degrees without any notable change in wear, durability or reliability.

Figure 11B:
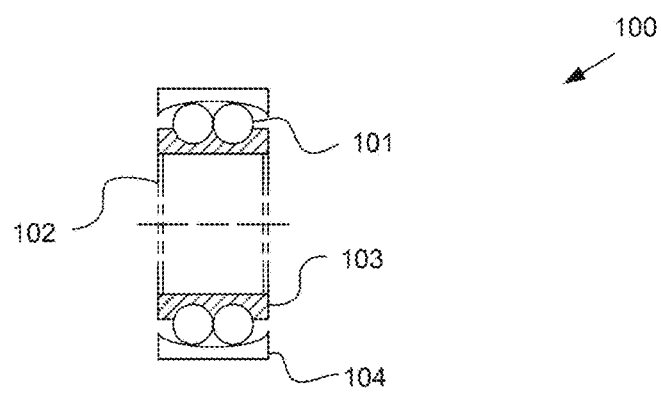
FIG. 11B is a cross section view of an embodiment of a self-aligning bearing.

FIG. 11B is a cross section view of an embodiment of the self-aligning bearing 100 including ball bearings 101, a shield 102, an inner race 103, and an outer race 104. The design of the self-aligning bearing 100 allows for misalignment between a rotating element, in this case the reel mixing tool 38, and the fixed position of the outer race 104, supported by the ball bearings 101 of the self-aligning bearing 100 that is disposed inside the real mixer gearbox 36. Any rotating shaft connection, such as the of the first auger 26 and first auger gearbox 32, and the second auger 28 and the second auger gearbox 34, respectively, can be joined using self-aligning hearings 100 similar to the use of the self-aligning bearing 100 in the aforementioned example.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

What is claimed is:

1. A system for driving a reel mixer, the system including:
a reel mixer gearbox;
a reel mixing tool connected to the reel mixer gearbox;
a unit structure connected to the reel mixer gearbox;
an output shaft connected to and supported by the unit structure;
an output gearbox connected to the output shaft and supported by the unit structure; and
a reel mixer driveshaft connected at a first end to the output gearbox and connected at a second end to the reel mixer gearbox,
wherein the unit structure supports the reel mixer gearbox, and the reel mixer gearbox supports and drives the reel mixing tool where the reel mixing tool is supported on both ends and is positioned substantially horizontal, and
wherein the output shaft drives the output gearbox, the output gearbox drives the reel mixer driveshaft, and the reel mixer driveshaft drives the reel mixer gearbox.

2. The system according to claim 1, further comprising:
a secondary gearbox connected to the unit structure;
a primary driveshaft connected at a first end to the output gearbox and connected at a second end to the secondary gearbox;
a first auger gearbox connected to the unit structure;

a first auger driveshaft connected at a first end to the secondary gearbox and connected at a second end to the first auger gearbox;
a first auger connected to and supported by the first auger gearbox;
wherein the output gearbox drives the primary driveshaft, the primary driveshaft drives the secondary gearbox, the secondary gearbox drives the first auger driveshaft, the first auger gearbox, and the first auger.

3. The system according to claim 2, further comprising:
a second auger gearbox connected to the unit structure;
a second auger driveshaft connected at a first end to the secondary gearbox and connected at a second end to the second auger gearbox; and
a second auger connected to and supported by the second auger gearbox,
wherein the secondary gearbox further drives the second auger driveshaft, the second auger gearbox, and the second auger, the output shaft mechanically transferring power through to the first auger and the second auger in parallel.

4. The system according to claim 1, further comprising:
a first auger gearbox connected to the unit structure;
a primary driveshaft connected at a first end to the output gearbox and connected at a second end to the first auger gearbox;
a first auger connected to and supported by the first auger gearbox;
wherein the output gearbox drives the primary driveshaft, the primary driveshaft drives the first auger gearbox, and the first auger gearbox drives the first auger.

5. The system according to claim 4, further comprising:
a second auger gearbox connected to the unit structure;
a second auger driveshaft connected at a first end to the first auger gearbox and connected at a second end to the second auger gearbox; and
a second auger connected to and supported by the second auger gearbox,
wherein the first auger gearbox further drives the second auger driveshaft, the second auger driveshaft drives the second auger gearbox, the output shaft mechanically transferring power through to the first auger and the second auger in series.

6. The system according to claim 1, further comprising:
a rear panel of the unit structure;
a circumferential spacer connected on a first side to the rear panel;
an outer ring connected to a second side of the circumferential spacer;
a circumferential seal disposed between the rear panel and the outer ring; and
a reel mixer gearbox flange disposed within the circumferential seal,
wherein the reel mixer gearbox is connected to the rear panel, the circumferential seal is disposed between, and in contact with, the rear panel and the outer ring, and the circumferential seal radially encompasses the reel mixer gearbox flange.

7. The system according to claim 6, wherein:
the portion of the rear panel surrounding the reel mixer gearbox is recessed toward the reel mixing tool.

8. The system according to claim 1, further comprising:
a reel mixer gearbox flange connected to the reel mixer gearbox;
a flexible coupling disposed between the reel mixer gearbox flange and the reel mixing tool,
wherein a first end of the flexible coupling includes an inner group of radially spaced holes and a second end of the flexible coupling includes an outer group of radially spaced holes, the first end of the flexible coupling is connected to the reel mixer gearbox flange and the second end of the flexible coupling is connected to the reel mixing tool.

9. The system according to claim 1, further comprising:
an internal bearing disposed within the reel mixer gearbox,
wherein at least one end of the reel mixing tool is supported by the internal bearing within the reel mixer gearbox, and the internal bearing is a self-aligning bearing.

10. The system according to claim 1, further comprising:
a gearbox mounting flange connected to the reel mixer gearbox; and
an elastomeric bushing,
wherein the elastomeric bushing is disposed between the gearbox mounting flange and the unit structure.

11. The system according to claim 1, further comprising:
a mounting bracket; and
an elastomeric pad,
wherein the reel mixer gearbox is connected to the mounting bracket, the mounting bracket connected to the unit structure by the elastomeric pad.

12. The system according to claim 11, wherein the mounting bracket comprises an elastomeric material.

13. The system according to claim 1, further comprising:
at least one torque limiting member,
wherein the at least one torque limiting member is disposed between the output gearbox and reel mixing tool.

14. The system according to claim 13, wherein:
the at least one torque limiting member is a slip clutch or a shear bolt.

15. A system for driving a reel mixer, the system including:
a reel mixer gearbox;
a reel mixing tool connected to the reel mixer gearbox;
a unit structure connected to the reel mixer gearbox;
a first hydraulic motor connected to the reel mixer gearbox;
a secondary gearbox connected to the unit structure;
a second hydraulic motor connected to the secondary gearbox;
a first auger gearbox connected to the unit structure;
a first auger driveshaft connected at a first end to the secondary gearbox and connected at a second end to the first auger gearbox; and
a first auger connected to and supported by the first auger gearbox;
wherein the unit structure supports the reel mixer gearbox, and the reel mixer gearbox supports and drives the reel mixing tool where the reel mixing tool is supported on both ends and is positioned substantially horizontal,
wherein the first hydraulic motor drives the reel mixer gearbox, and
wherein the second hydraulic motor drives the secondary gearbox, the secondary gearbox drives the first auger driveshaft and the first auger gearbox, allowing the second hydraulic motor to transfer power to the first auger.

16. The system according to claim 15, further comprising:
a pressure relief valve;
wherein torque supplied to the reel mixing tool is limited by the pressure relief valve.

17. The system according to claim 15, further comprising:
a second auger gearbox connected to the unit structure;
a second auger driveshaft connected at a first end to the secondary gearbox and connected at a second end to the second auger gearbox; and
a second auger connected to and supported by the second auger gearbox,
wherein the secondary gearbox further drives the second auger driveshaft and the second auger gearbox, allowing the second hydraulic motor to transfer power to the first auger and the second auger in parallel.

18. A system for driving a reel mixer, the system including:
a reel mixer gearbox;
a reel mixing tool connected to the reel mixer gearbox;
a unit structure connected to the reel mixer gearbox;
a first hydraulic motor connected to the reel mixer gearbox;
a first auger gearbox connected to the unit structure;
a second hydraulic motor connected to the first auger gearbox; and
a first auger connected to and supported by the first auger gearbox;
wherein the unit structure supports the reel mixer gearbox, and the reel mixer gearbox supports and drives the reel mixing tool where the reel mixing tool is supported on both ends and is positioned substantially horizontal,
wherein the first hydraulic motor drives the reel mixer gearbox, and
wherein the second hydraulic motor drives the first auger gearbox, and the first auger gearbox drives the first auger.

19. The system according to claim 18, further comprising:
a second auger gearbox connected to the unit structure;
a second auger driveshaft connected at a first end to the first auger gearbox and connected at a second end to the second auger gearbox; and
a second auger connected to and supported by the second auger gearbox,
wherein the first auger gearbox drives further the second auger driveshaft, the second auger driveshaft drives the second auger gearbox, the output shaft mechanically transferring power through to the first auger and the second auger in series.

* * * * *